US011388117B2

(12) United States Patent
Kim et al.

(10) Patent No.: US 11,388,117 B2
(45) Date of Patent: Jul. 12, 2022

(54) APPARATUS AND OPERATING METHOD OF INSTANT MESSENGER APPLICATION

(71) Applicant: KAKAO CORP., Jeju-si (KR)

(72) Inventors: Gui Yeoun Kim, Yongin-si (KR); Min Il Park, Seongnam-si (KR); Young Woo Nam, Seoul (KR); Sun Joo Oh, Namyangju-si (KR); Min Gyoo Jung, Guri-si (KR); Hyo Jung Sung, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 25 days.

(21) Appl. No.: 16/663,410

(22) Filed: Oct. 25, 2019

(65) Prior Publication Data

US 2020/0137005 A1 Apr. 30, 2020

(30) Foreign Application Priority Data

Oct. 26, 2018 (KR) ........................ 10-2018-0129353

(51) Int. Cl.
*G06F 15/16* (2006.01)
*H04L 51/04* (2022.01)
*H04L 51/52* (2022.01)
*H04L 51/42* (2022.01)

(52) U.S. Cl.
CPC .............. *H04L 51/04* (2013.01); *H04L 51/22* (2013.01); *H04L 51/32* (2013.01)

(58) Field of Classification Search
USPC ........................................... 709/206
See application file for complete search history.

(56) References Cited

U.S. PATENT DOCUMENTS

| | | | |
|---|---|---|---|
| 2008/0307343 A1* | 12/2008 | Robert | G06F 3/0482 715/765 |
| 2012/0214564 A1* | 8/2012 | Barclay | G07F 17/3272 463/11 |
| 2013/0262575 A1* | 10/2013 | Xiong | H04N 21/254 709/204 |
| 2016/0191433 A1* | 6/2016 | Song | H04L 51/04 709/206 |
| 2017/0054664 A1* | 2/2017 | Lee | H04L 51/16 |
| 2017/0243204 A1* | 8/2017 | Murphy | G06Q 20/3829 |
| 2017/0285885 A1* | 10/2017 | Henderson | H04L 12/1827 |
| 2017/0346777 A1* | 11/2017 | Kim | G06F 3/0482 |
| 2018/0032518 A1* | 2/2018 | Kordasiewicz | G06Q 50/18 |
| 2018/0041452 A1* | 2/2018 | Reading | H04L 9/3268 |
| 2018/0126269 A1* | 5/2018 | Lourenco | A63F 13/46 |
| 2018/0337968 A1* | 11/2018 | Faulkner | H04L 12/1813 |
| 2018/0351903 A1* | 12/2018 | Allen | G06Q 10/10 |
| 2020/0026768 A1* | 1/2020 | Puzicha | G06F 16/93 |

\* cited by examiner

*Primary Examiner* — Anthony Mejia
(74) *Attorney, Agent, or Firm* — Cantor Colburn LLP

(57) ABSTRACT

An operating method of an instant messenger application includes providing a first view including types of data sent and received through a chatroom, receiving a selection with respect to one of the types, and providing a second view integrating and displaying data corresponding to the selected type, among data sent and received in a plurality of chatrooms in which a user participates.

12 Claims, 11 Drawing Sheets

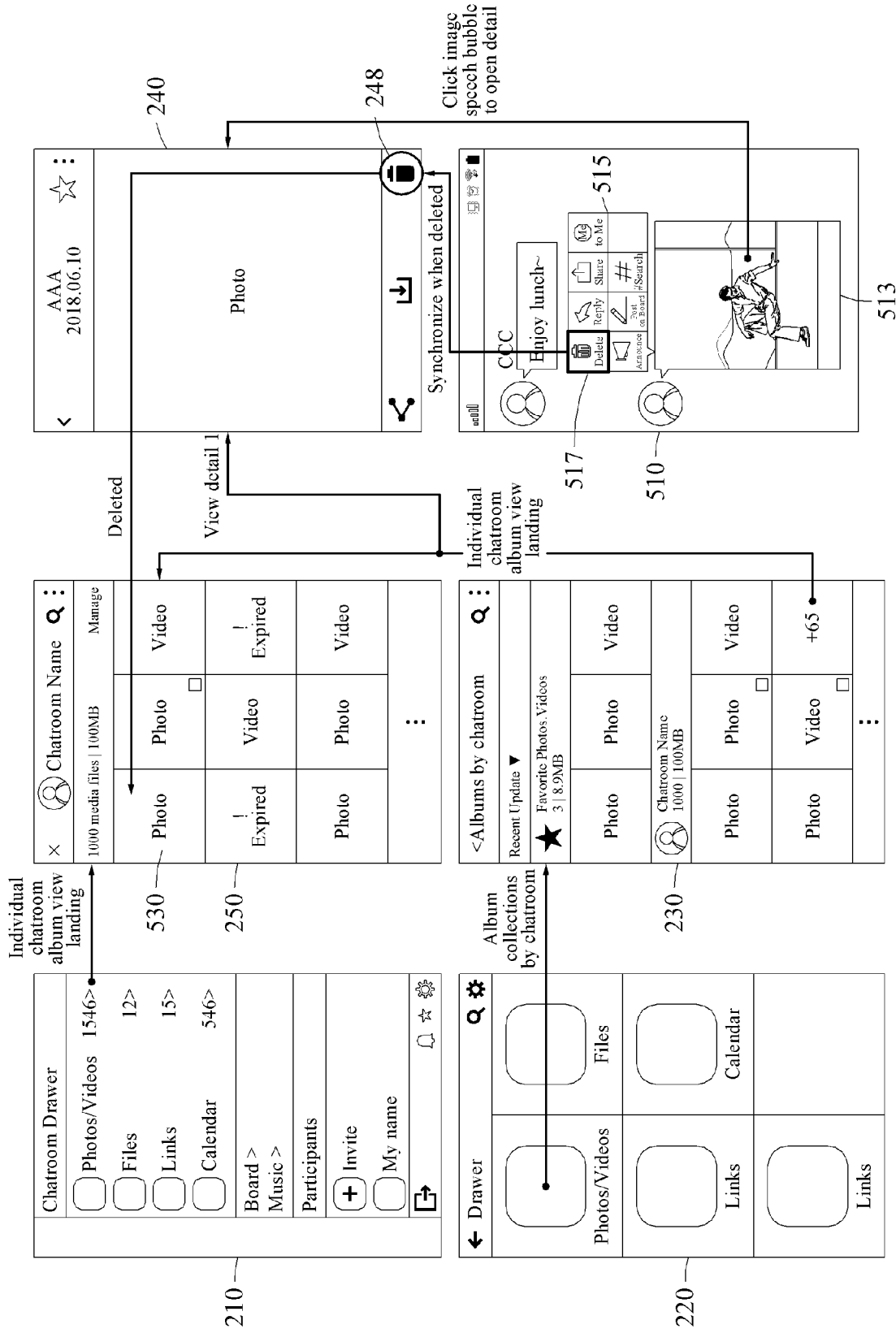

APPARATUS AND OPERATING METHOD OF INSTANT MESSENGER APPLICATION

CROSS-REFERENCE TO RELATED APPLICATION(S)

This application claims the benefit of Korean Patent Application No. 10-2018-0129353, filed on Oct. 26, 2018, in the Korean Intellectual Property Office, the disclosure of which is incorporated herein by reference.

BACKGROUND

1. Field of the Invention

One or more example embodiments relate to an apparatus and operating method of an instant messenger application.

2. Description of the Related Art

A user may participate in a number of various chatrooms through an instant messenger application to chat and/or share data with the other participants. In this example, it is not easy for the user to access data sent and received in the chatrooms unless the user enters the separate chatrooms in which the data were sent and received. In addition, it is difficult for the user to integrate and manage data distributed in the chatrooms in which the user participates, and to safely store the data distributed in the chatrooms.

SUMMARY

An aspect provides an operating method of an instant messenger application, the operating method including providing a first view including types of data sent and received through a chatroom, receiving a selection with respect to one of the types, providing a second view integrating and displaying data corresponding to the selected type, among data sent and received in a plurality of chatrooms in which a user participates, receiving a selection with respect to one of the data included in the second view, and providing a third view for detail view of the selected data, by accessing the selected data based on an access path corresponding to an account level of the user.

The providing of the third view may include determining whether the selected data is stored in a local storage of a terminal on which the instant messenger application is installed, displaying the selected data by loading the selected data from the local storage, in response to determination that the selected data is stored in the local storage, and displaying the selected data by downloading the selected data from a mailbox of a messaging server, in response to determination that the selected data is not stored in the local storage.

The providing of the third view may include displaying the selected data by downloading the selected data from a storage of a cloud server.

The operating method may further include, when a search request for searching for the data corresponding to the selected type is received through the second view, providing a fifth view including at least one of a first search interface for searching for a sender of the data corresponding to the selected type and a second search interface for searching for a sending date of the data corresponding to the selected type.

The first search interface may include a predetermined number of sender candidates selected from participants in the plurality of chatrooms based on a data sending count, and the second search interface may include a predetermined number of sending date candidates selected from dates the data corresponding to the selected type were sent in the plurality of chatrooms, based on the data sending count.

The operating method may further include displaying data corresponding to search results through the fifth view, and displaying profiles of chatrooms to which the data corresponding to the search results belong.

The operating method may further include receiving a delete request for one of the integrated data, and deleting a message corresponding to the delete-requested data, among a plurality of messages in a chatroom through which the delete-requested data was sent.

The operating method may further include receiving a leave request for one of the plurality of chatrooms, and deleting data sent in the leave-requested chatroom, among the integrated data.

The operating method may further include providing a guide including an option inquiring of whether to maintain the data sent in the leave-requested chatroom without deleting the data, in response to reception of the leave request. The deleting may be performed based on whether the option is selected.

The operating method may further include receiving a selection with respect to an entry point for accessing favorite data marked by the user, among the data, in the first view, and providing a sixth view integrating and displaying the favorite data, among the data sent and received in the plurality of chatrooms, in response to the selection with respect to the entry point.

The providing of the sixth view may include integrating the favorite data based on a time the favorite data was marked by the user, and displaying timeline feeds corresponding to the integrated favorite data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 5 illustrates a process of deleting data in an instant messenger application according to an example embodiment;

DETAILED DESCRIPTION

Figure 1:
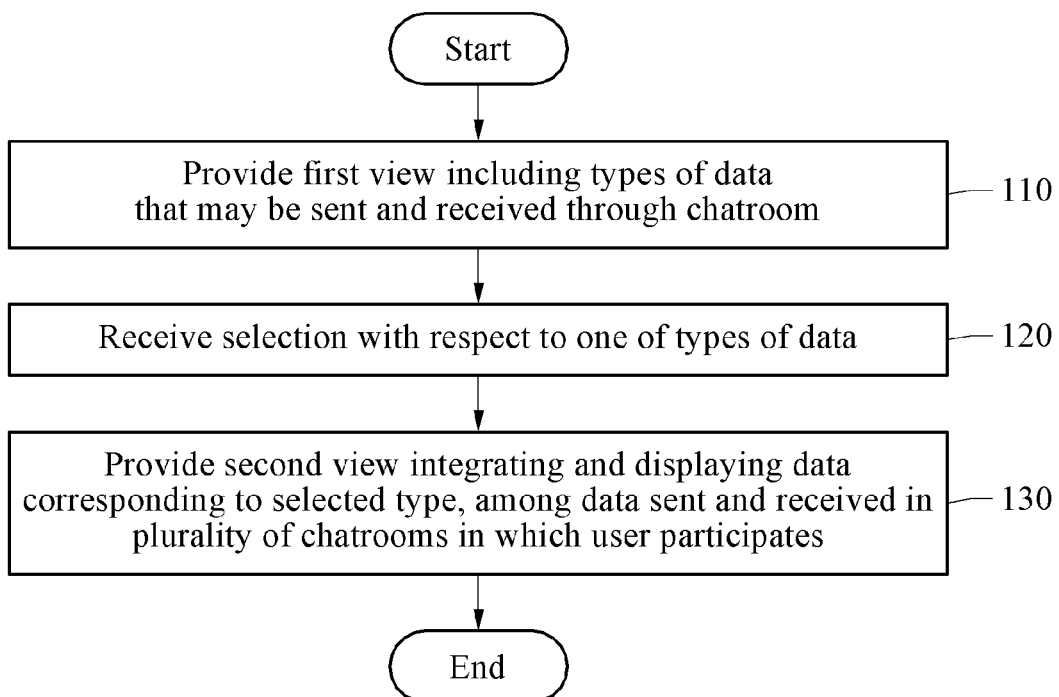
FIG. 1 is a flowchart illustrating an operation method of an instant messenger application according to an example embodiment.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a flowchart illustrating an operation method of an instant messenger application according to an example embodiment. Referring to FIG. 1, in operation 110, a terminal may provide a first view including types of data that may be sent and received through a chatroom.

The terminal may be driven by an application installed on the terminal. For example, an application for integrating and managing and/or providing data sent and received in a plurality of chatrooms may be installed on the terminal. The application may include an application for providing an instant messaging service or a social networking service. The terminal may include, for example, a personal computer (PC), a netbook, a notebook, a personal digital appliance (PDA), a smart phone, a wearable device, and various user display devices configured to perform similar functions.

The "types of data that may be sent and received through a chatroom" may include, for example, a text type such as a memo, a link type such as an app link or a web link, a calendar type such as a schedule, an image content type such as a photo or a video, or a file type. In addition, the types of data that may be sent and received through a chatroom may further include a favorite data type corresponding to favorite data marked by the user.

The first view may be provided through an instant messenger application for integrating and managing and/or providing data sent and received in a plurality of chatrooms. The first view may correspond to a home screen or main screen of a storage service, for example, "Talk Drawer", provided in the instant messenger application. The first view may include icons corresponding to the types of data that may be sent and received through a chatroom, for example, as shown in a first view 220 of FIG. 2.

The first view may be provided when the user selects an icon for entering Talk Drawer, for example, a "Go to My Drawer Home" icon, in a side menu included in a 1:1 chatroom or a group chatroom, or a side menu included in "my chatroom" for a messaging service with the user him/herself. In this example, "my chatroom" may provide a setting page for my chatroom in the form of a modal view. The setting page may include, for example, a name setting menu of the chatroom, and a chatroom setting menu including a wallpaper of the chatroom, a notification tone of the chatroom, emailing messages, and storing messages as a document. In addition, the setting page may include a storage space management menu for data sent and received through my chatroom. The storage space management menu may include, for example, delete all messages, delete all media files, and delete all general files.

In operation 120, the terminal may receive a selection with respect to one of the types of the data included in the first view. For example, when the user selects one of the icons corresponding to the types of the data included in the first view, the terminal may receive a notification indicating that a type corresponding to the selected icon is selected.

In operation 130, the terminal may provide a second view integrating and displaying data corresponding to the selected type, among the data sent and received in a plurality of chatrooms in which the user participates. In operation 130, the terminal may classify the integrated data corresponding to the type selected by the user, for example, by predetermined category. The terminal may display a plurality of groups corresponding to the category, based on a classification result. Here, the predetermined category may include, for example, various classification criteria, such as by chatroom, by date, by user, and/or whether marked as favorites. For example, a group of data for each of the plurality of chatrooms of the integrated data, a group of data for each date of the integrated data, a group of data for each user who sent the integrated data, and a group of favorite data marked as favorites among the integrated data may be displayed in the second view. An example of the second view may be a second view 230 of FIG. 2.

For example, it may be assumed that the chatrooms in which the user participates are a chatroom A, a chatroom B and a chatroom C, and a type selected by the user is an image content type, for example, a photo/video type. In this example, the terminal may integrate photo(s) and/or video(s) sent and received in the chatroom A, the chatroom B and the chatroom C, and classify the integrated data by predetermined category, for example, by chatroom. The terminal may display a plurality of groups including photo(s) and/or video(s) for each chatroom. For example, a first group including photo(s) and/or video(s) sent and received in the chatroom A, a second group including photo(s) and/or video(s) sent and received in the chatroom B, and a third group including photo(s) and/or video(s) sent and received in the chatroom C may be displayed in the second view. The first group, the second group, and the third group may correspond to, for example, album collections for the respective chatrooms.

In this example, preview icons (for example, refer to 231 of FIG. 2) of the photo(s) and/or video(s) included in the each group may be displayed in the second view. A preview icon may be, for example, a thumbnail-type icon of a corresponding photo or video.

A view more icon may be displayed based on the number of photo(s) and/or video(s) included in each group. For example, if the number of photo(s) and/or video(s) included in each of the first group, the second group, and the third group included in the second view is greater than a predetermined number, preview icons of a predetermined number of photo(s) and/or video(s) and a view more icon (for example, refer to 233 of FIG. 2) may be displayed in each group. The view more icon may indicate that at least a portion of photo(s) and/or video(s) belonging to the corresponding group is not displayed on the current screen. The user may access a view including all the photo(s) and/or video(s) belonging to the corresponding group by selecting the view more icon.

If the number of the photo(s) and/or video(s) included in each group is less than the predetermined number, a view more icon may not be displayed in the second view, and the preview icons (for example, refer to 231 of FIG. 2) of the photo(s) and/or video(s) included in the each group may be displayed in the second view.

The terminal may receive a selection with respect to one of the data included in the second view. In this example, the terminal may provide a third view for detail view of the selected data, by accessing the selected data based on an access path corresponding to an account level of the user, for example, a free user or a paid user. The operation of providing the third view will be described further below with reference to FIG. 3.

According to an example embodiment, it is possible to integrate and manage data sent and received in a plurality of chatrooms in which a user participates, through a storage service "Talk Drawer" provided by an instant messenger application.

Further, according to an example embodiment, a management policy including a storing period and/or a storing location with respect to the data managed through Talk Drawer may be changed based on the types of the data and/or the type of the user, for example, an account level such as a paid user or a free user. In an example, the data storing period for a paid user may be limitless, and the data storing period for a free user may be limited to a predetermined period, for example, 1 month or 1 year.

Figure 2:
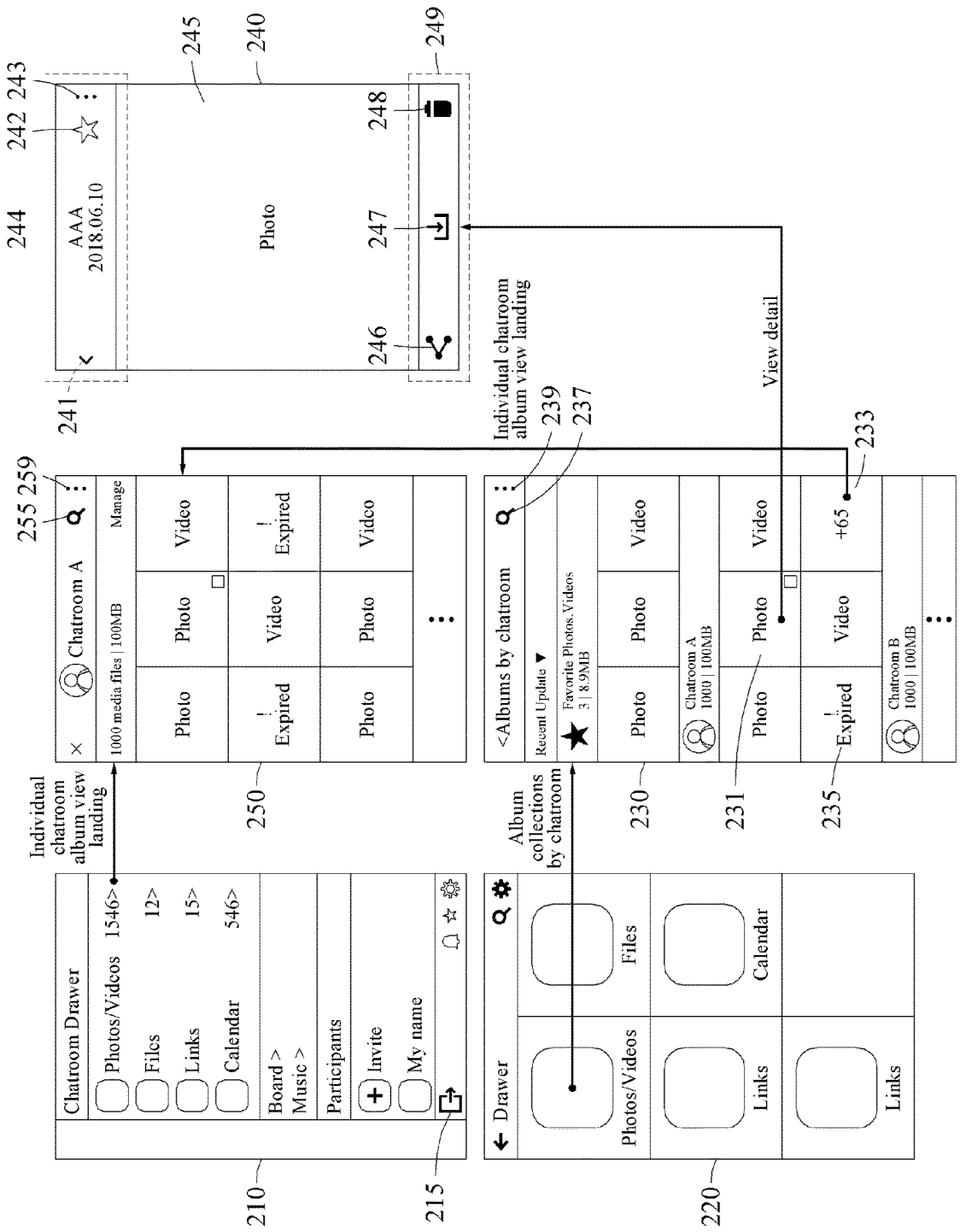
FIG. 2 illustrates a plurality of views provided in an instant messenger application according to an example embodiment.

FIG. 2 illustrates a plurality of views provided in an instant messenger application according to an example embodiment. Referring to FIG. 2, a screen 210 showing a side menu of an individual chatroom, the first view 220, the second view 230, a third view 240, and a fourth view 250 are illustrated.

The screen 210 may be, for example, a side menu of a 1:1 chatroom or a group chatroom. The screen 210 may include icons, for example photo/video, file, link, calendar, and the like, classified by the types of the data included in the individual chatroom. When a user selects one of the types of the data included in the screen 210, a terminal may link a landing page of a view displaying the data corresponding to the selected type. For example, when the user selects a photo/video icon included in the screen 210, the terminal may link a landing page of a view displaying photo(s)/video(s) sent and received in the corresponding chatroom, for example, an individual chatroom album view. When the landing page of the individual chatroom album view is linked, the fourth view 250 may be displayed on the terminal.

As such, when the user selects an icon corresponding to a type of data belonging to a 1:1 chatroom or a group chatroom through the screen 210, the terminal may display a view displaying data linked with the corresponding chatroom with respect to the selected icon.

The user may leave the chatroom by selecting a leave icon 215 displayed on the screen 210.

As described above, the first view 220 may correspond to a home screen or a main screen of Talk Drawer. The first view 220 may include icons corresponding to types of data that may be sent and received through a chatroom. In an example, the number of data of a corresponding type may be displayed together with an icon included in the first view 220. For example, the total size or number of data of a corresponding type may be displayed together with a photo/video icon, like "30 GB/3500".

Unlike the screen 210, the first view 220 may not include a leave icon, and thus the user may not leave the chatroom through the first view 220.

Hereinafter, for ease of description, an example in which an image content type (photo/video) is selected from among the types of data included in the first view 220 will be described. However, the example embodiments are not limited thereto. The description may also apply to examples in which other various types of data are selected.

For example, when a user X select an image content type from among the types of data by clicking a photo/video icon displayed in the first view 220, the terminal may provide the second view 230 integrating and displaying photo/video data, among data sent and received in a plurality of chatrooms A, B and C in which the user X participates.

The second view 230 may include a plurality of groups, for example, albums for the chatrooms A, B and C, by predetermined category, for example, by chatroom, as described above. In this example, photo(s) and video(s) marked as favorite photo(s) or video(s) by the user X in the chatrooms A, B and C may be displayed together in the second view 230. The plurality of groups, for example, the albums for the chatrooms A, B and C, may be displayed in a predetermined region assigned in the second view 230 according to a preset arrangement criterion. The plurality of groups may be displayed in an alphabetical order of names of chatrooms of the groups, displayed in an order of recent chatrooms in which chatting is performed, or displayed in an order of groups including a largest number of photos/videos classified.

The second view 230 may include preview icons 231 and a view more icon 233 of the photo(s) and/or video(s) included in each group. When a predetermined period for the photo(s) and/or video(s) included in the corresponding group elapses, the terminal may display a lapse of period icon 235 substituting for a preview icon of the photo(s) and/or video(s).

Further, the second view 230 may include a search icon 237 and/or a view more icon 239. The search icon 237 may be an icon for receiving a search request from a user to search data included in the second view 230. An operation performed when a search request is received at the terminal through selecting the search icon 237 displayed in the second view 230 will be described further below with reference to FIG. 4.

The view more icon 239 may provide an access to at least one function currently not displayed on the screen, among functions provided in the second view 230. For example, at least one of album selection and photo selection may be provided through the view more icon 239. The album selection may be a function to select photos in a unit of album, and the photo selection may be a function to select photos in a unit of individual photo. The selected album(s) or photo(s) may be processed all at once, for example, stored all at once, shared all at once, or deleted all at once. Meanwhile, when all the functions are currently displayed on the screen, the view more icon 239 may not be provided.

For example, when the user selects the preview icons 231 included in a first group of photo(s) and/or video(s) sent and received through the chatroom A in the second view 230, the terminal may provide the third view 240 for detail view of data, for example, photos, corresponding to the preview icon 231. In this example, original data, for example, a photo or a video, of the chatroom A corresponding to the preview icon 231 may be displayed in the third view 240.

The third view 240 may include a back icon 241. The third view 240 may be opened as a push view, and may return to a previous page when the user selects the back icon 241.

The third view 240 may include a favorite icon 242 and/or a view more icon 243. When a favorite function is activated with respect to the corresponding data in response to the favorite icon 242 being selected by the user in the third view 240, the terminal may copy the data (photo or video) corresponding to the third view 240 and add the copied data to a favorite album. When the favorite function is activated, the user may cancel the activation of the favorite function by reselecting the favorite icon 242. When the activation of the favorite function is cancelled, the corresponding data may be deleted from the favorite album.

When the user selects the view more icon 243 in the third view 240, a view more menu may be displayed. In this example, the view more menu may include message view and information related to the data corresponding to the third view 240. When the user selects the message view in the view more menu, a message associated with the photo or video displayed in the third view 240 may be displayed on the screen of the terminal. For example, when the message view is selected, the screen may be switched to a screen of the chatroom in which the photo or video displayed in the third view 240 was sent. In an example, in the screen of the corresponding chatroom, a message sent at or around a point in time at which the photo or video displayed in the third view 240 was sent, in the message history in the corresponding chatroom, may be displayed.

In addition, information related to a sender who sent the corresponding data may be displayed in a top common region 244. The data (photo or video) may be displayed in a main region 245 of the third view 240. For example, a share icon 246, a download icon 247, and a delete icon 248 may be included in a bottom common region 249 of the third view 240. The third view 240 may be referred to as a "detail view screen".

For example, when the user selects the view more icon 233 included in the first group of the photo(s) and/or video(s) sent and received through the chatroom A in the second view 230, the terminal may provide the fourth view 250 displaying data corresponding to a predetermined group, for example, the first group, to which the view more icon 233 belongs, by linking a landing page of an album view of the chatroom A.

The fourth view 250 may correspond to a page the same as the fourth view 250 provided as the landing page of the album view is linked on the screen 210, described above. The fourth view 250 may correspond to a screen showing data classified by type in an individual chatroom, for example, "My Drawer Screen".

In this example, preview icons displayed in the fourth view 250 may be displayed to be arranged based on points in time at which data corresponding to the preview icons were updated in the corresponding chatroom. The fourth view 250 may include a search icon 255 and/or a view more icon 259.

When the user selects one of the preview icons, for example, second preview icons, included in the fourth view 250, the terminal may provide a view similar to the third view 240 for detail view of data corresponding to the selected preview icon, for example, the selected second preview icon.

Figure 3:
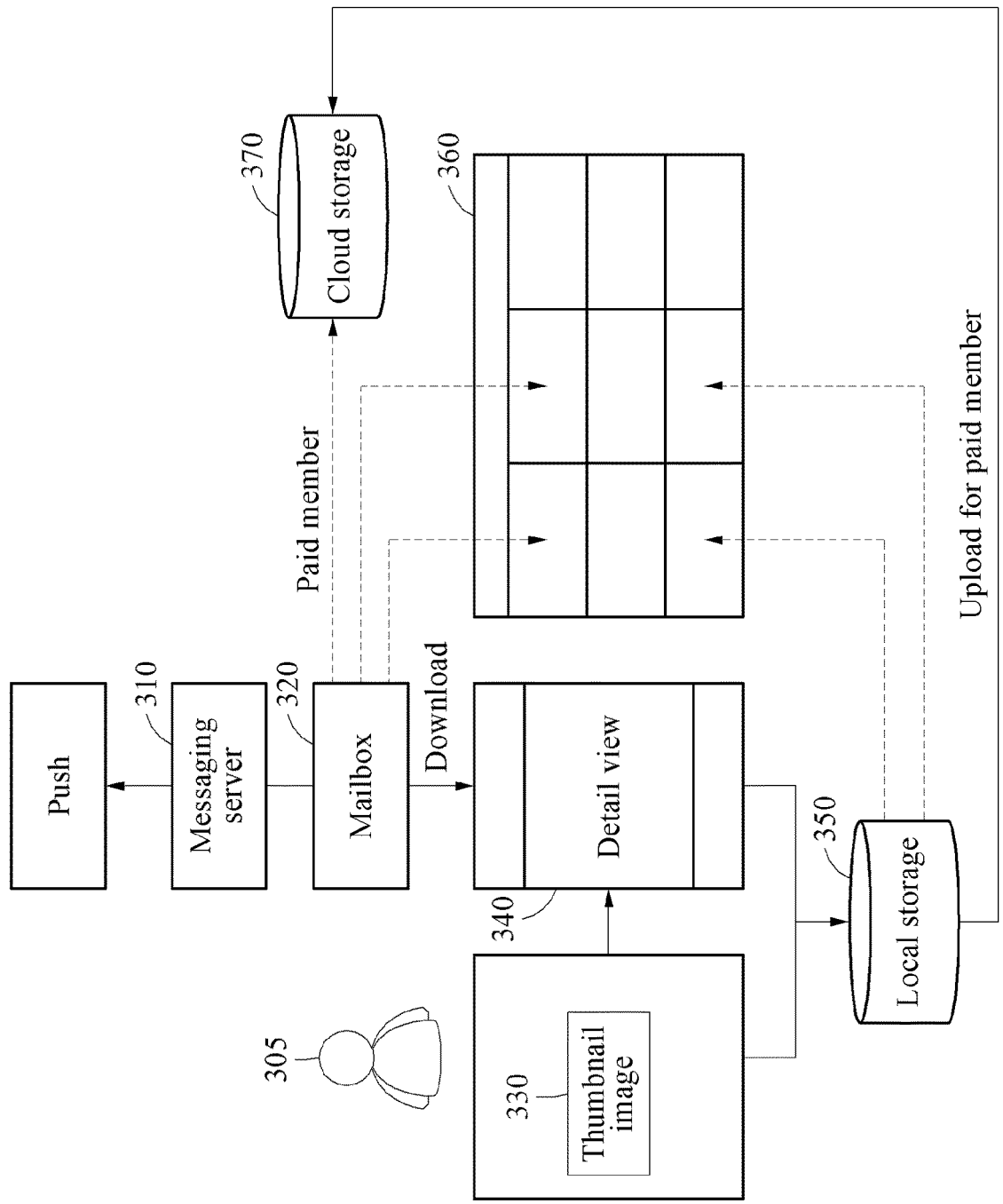
FIG. 3 illustrates a process of providing a view according to an example embodiment.

FIG. 3 illustrates a process of providing a view according to an example embodiment. Referring to FIG. 3, a messaging server 310, a mailbox 320 of the messaging server 310, a terminal, and a cloud storage 370 of a cloud server are illustrated.

The mailbox 320 may temporarily store a message sent through the messaging server 310. The sent message may be stored in the mailbox 320 for a predetermined period, and a recipient of the message may download the message from the mailbox 320. The terminal of the recipient may store the downloaded message in a local storage 350 of the terminal. For ease of description, the mailbox 320 and the cloud storage 370 are illustrated separately. However, the mailbox 320 and the cloud storage 370 may be implemented by the same storage system or apparatus.

When an account level of a user 305 is a paid user, a message may be stored in the cloud storage 370 depending on a type of the message received by the user 305. In this example, the user 305 may download the data without a limit of period, as long as maintaining the account level.

In response to reception of push information of data requested to be transmitted through a chatroom in which the user 305 of the terminal participates, the terminal may display a preview icon 330 of the data in the chatroom based on the push information. The preview icon 330 may be, for example, a thumbnail image. In this example, the push information of the data requested to be transmitted may be stored in the local storage 350 of the terminal on which an instant messenger application is installed.

When the user requests for detail view 340 of the data by selecting the preview icon 330, the terminal may identify an account level of the user, and determine an access path to access the data for the detail view 340 based on the account level.

For example, when the account level of the user 305 is a free user, data may be stored in the mailbox 320 of the messaging server 310, or stored in the local storage 350 of the terminal on which the instant messenger application is installed. Thus, when the user selects the preview icon 330 to request for data corresponding to the preview icon 330, the terminal may determine whether the data is stored in the local storage 350 of the terminal on which the instant messenger application is installed. In response to determination that the data is stored in the local storage 350, the terminal may display the data by loading the data from the local storage 350. Conversely, in response to determination that the data is not stored in the local storage 350, the terminal may display the data by downloading the data from the mailbox 320 of the messaging server 310.

When the account level of the user 305 is a paid user, the data may be stored in the cloud storage 370. When the user selects the preview icon 330 to request for the corresponding data, the terminal may display the data by downloading the requested data from the cloud storage 370.

The access path described above may similarly apply to an example in which the detail view 340 is requested, and also to an example in which a thumbnail image is requested.

When the account level of the user is changed from a free user to a paid user, the data stored in the mailbox 320 of the messaging server 310 and/or the local storage 350 may be automatically stored in the cloud storage 370. When the account level of the user is changed to a paid user, the user may upload the data stored in the mailbox 320 of the messaging server 310 and/or the local storage 350 directly to the cloud storage 370.

In an example, data stored in the cloud storage 370 may be stored without a limit of storage period, irrespective of a type of the data. Further, data stored in the mailbox 320 of the messaging server 310 and/or the local storage 350 may have a limit of storage period depending on a type of the data. When the type of the data stored in the mailbox 320 of the messaging server 310 and/or the local storage 350 is, for example, a text type, a link type, or a calendar type, the data may be stored in the mailbox 320 of the messaging server 310 and/or the local storage 350 without a limit of period. Conversely, when the type of the data is an image content type or a file type, the data may be stored in the mailbox 320 of the messaging server 310 and/or the local storage 350 for a limited period, for example, for 30 days.

Figure 4A:
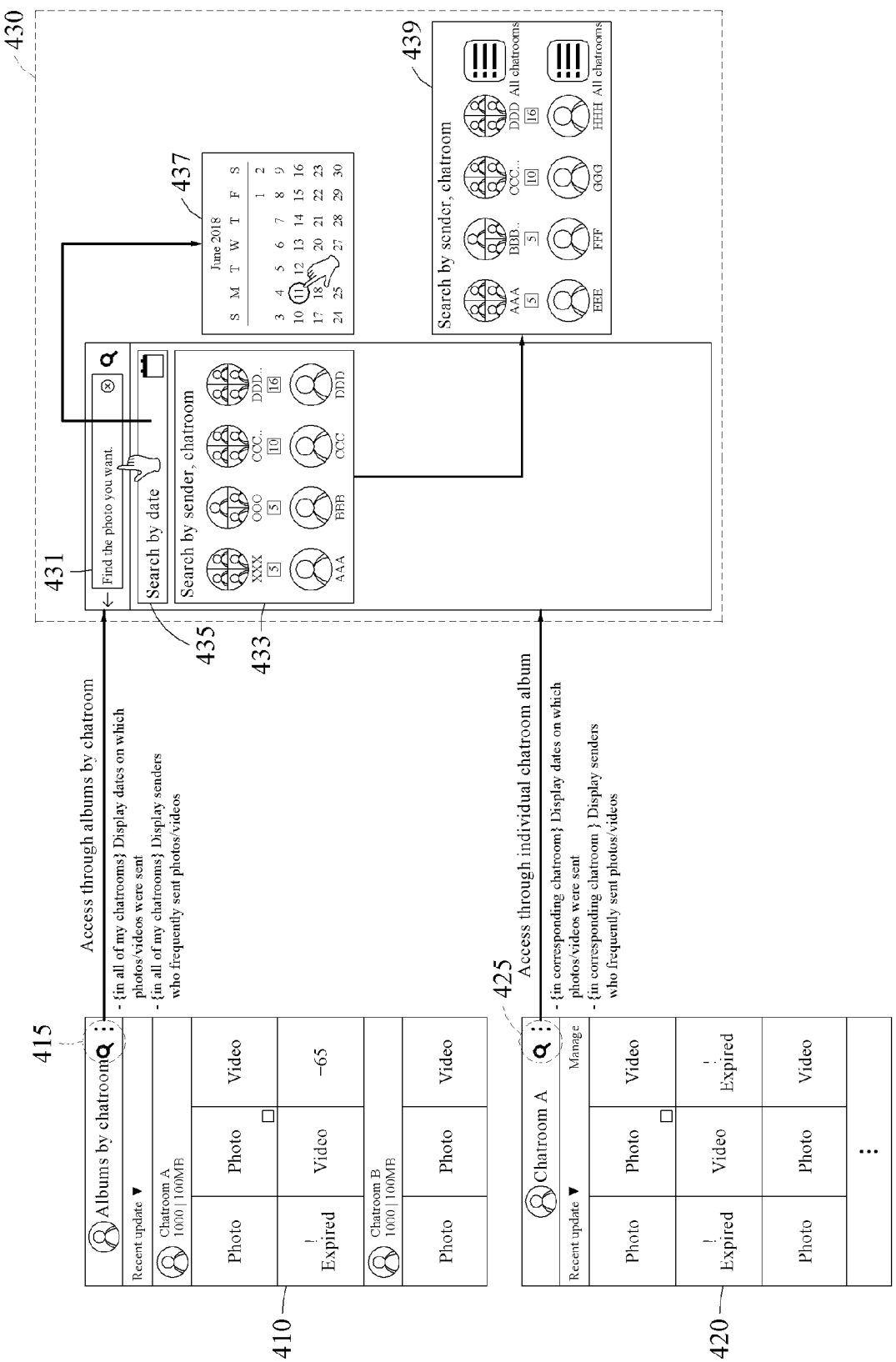
FIGS. 4A through 4C illustrate a process of searching for data through a view provided in an instant messenger application according to an example embodiment.
Figure 4B:
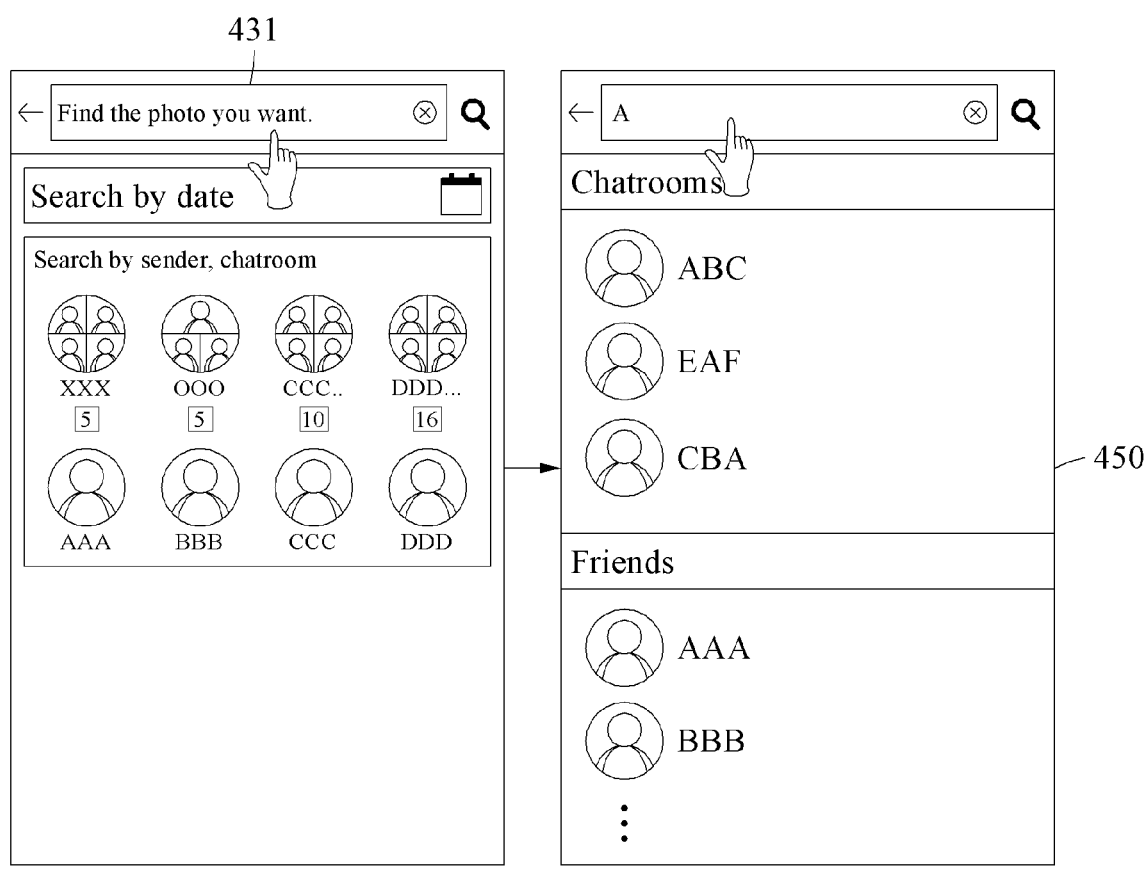
Figure 4C:
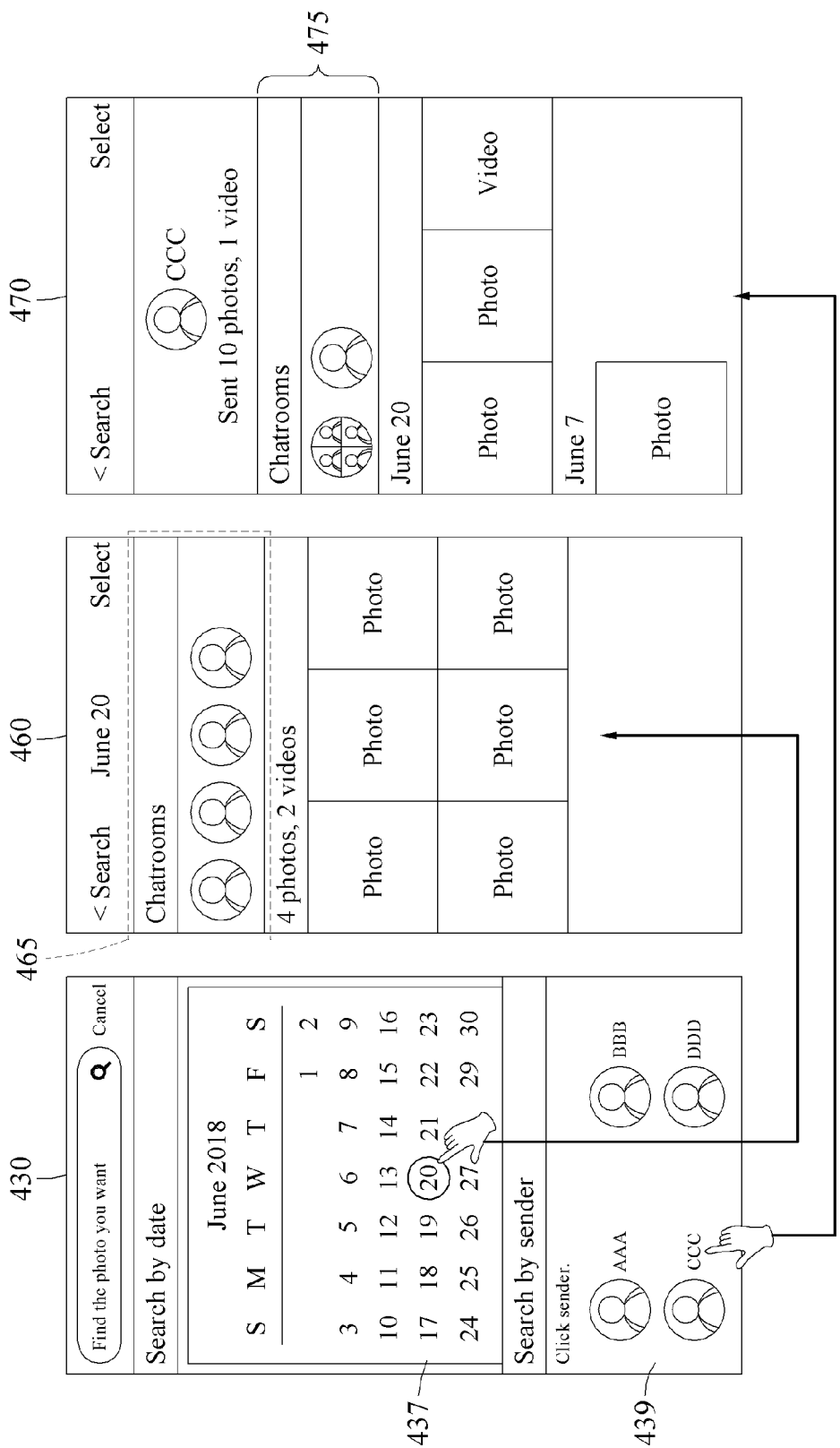

FIGS. 4A through 4C illustrate a process of searching for data through a view provided in an instant messenger application according to an example embodiment. Referring to FIG. 4A, an operation performed when a search request for searching data is received through a second view 410 or a fourth view 420 is illustrated.

For example, a user may select a search icon 415 to search for data in a second view 410. In response to the search icon 415 being selected, a terminal may provide a fifth view 430. The fifth view 430 may include a search interface 431 for searching for data (photo and/or video) corresponding to a type of data selected by the user in the first view, for example, an image content type.

When the user searches for a sender name in the search interface 431, a list of photos sent by a sender having the name in all chatrooms corresponding to the second view 410 may be displayed. The search interface 431 may include a suggest logic function which automatically suggests a search word when the user inputs a keyword. A sender may be another user being a friend of the user in an instant messaging service, or may not be a friend in some examples. For example, when a message is received from an account not registered as a friend, or when a message is received in a chatroom which anonymous users are in, a sender may not be a friend.

The suggest logic function of the search interface 431 will be described further below with reference to FIG. 4B.

When a type of data to be found is an image content type, a keyword-based search may not be easy. Thus, in addition to the search interface 431, additional search interfaces, for example, a first search interface 433 and a second search interface 435, may be provided for data search.

For example, when the search icon 415 is selected, the terminal may display senders who frequently sent photos/videos in a plurality of chatrooms in which the user participates, through the first search interface 433. The senders who frequently sent photos/videos may be displayed, for example, in the form of a screen 439. Further, the terminal may display dates on which the photos/videos were sent in the plurality of chatrooms in which the user participates, through the second search interface 435. The dates on which the photos/videos were sent may be displayed in the form of calendar, for example, as in a screen 437.

The first search interface 433 included in the fifth view 430 may be provided to search for a sender of data corresponding to the selected type, for example, the image content type. When the user selects the first search interface 433, a screen 439 including sender candidates may be provided. The screen 439 may include, for example, a predetermined number of sender candidates selected from among participants in a plurality of chatrooms based on data sending counts. For example, among all participants of a chatroom A, a chatroom B and a chatroom C in which the user participates, a participant a-1 of the chatroom A, a participant a-2 of the chatroom A, a participant b of the chatroom B, and a participant c of the chatroom C may have photo sending counts greater than a preset reference count. In this example, if the number of sender candidates is predetermined to be "3", the terminal may set the participants a-1, a-2 and b as the sender candidates, among the four participants a-1, a-2, b and c, in an order of greatest photo sending counts. The terminal may display the senders set as the sender candidates to be distinguished from the remaining senders (not being the sender candidates) in the first search interface 433.

The second search interface 435 included in the fifth view 430 may be provided to search for a sending date of data corresponding to the selected type, for example, the image content type. The second search interface 435 may be provided in the form of a calendar screen 437 for date search. The calendar screen 437 may include, for example, a predetermined number of sending date candidates selected from among dates on which data corresponding to the selected type were sent in the plurality of chatrooms, based on data sending counts. For example, it may be assumed that photos were sent from Jun. 1 to Jun. 11, 2018 in the plurality of chatrooms in which the user participates, and photo sending counts of June 2, 3, 4 and 7 are greater than a preset reference count. In this example, the terminal may set June 2, June 3, 4 and 7 as sending date candidates in the second search interface 435. The dates set as the sending date candidates may be displayed to be distinguished from the other dates in the second search interface 435.

For example, it may be assumed that the user selects a search icon 425 to search for data in a fourth view 420. The terminal may provide the fifth view 430 in response to the search icon 425 being selected. In this example, when the user searches for a sender (friend) name in the search interface 431 included in the fifth view 430, a list of photos sent by a sender (friend) having the name in a chatroom corresponding to the fourth view 420 may be displayed.

Similarly, when the search icon 425 is selected, the first search interface 433 included in the fifth view 430 may be provided to search for a sender of data corresponding to the selected type, for example, the image content type. When the user having selected the search icon 425 selects the first search interface 433, the screen 439 including sender candidates may include a predetermined number of sender candidates selected from among participants in the corresponding chatroom, rather than the plurality of chatrooms, based on data sending counts. Further, when the user having selected the search icon 425 selects the second search interface 435, the calendar screen 437 for date search may include a predetermined number of sending date candidates selected from among dates on which data corresponding to the selected type were sent in the corresponding chatroom, rather than the plurality of chatrooms, based on data sending counts.

Referring to FIG. 4B, the suggest logic function provided through the search interface 431 of the fifth view 430 is illustrated. The "suggest logic" function may correspond to a function to automatically suggest or display search results associated with a keyword input into the search interface 431.

For example, the user may touch the search interface 431 of the fifth view 430 and input a keyword A thereinto. In this example, the terminal may suggest or display a list of chatrooms matched to the input keyword A in an order of last chats, as a search result associated with the keyword A through the suggest logic function, as shown in a screen 450. In another example, the terminal may suggest or display friend names matched to the input keyword A in an order of matching accuracies, as a search result associated with the keyword A through the suggest logic function.

In this example, based on whether the search interface 431 of the fifth view 430 is accessed through the search icon 415 of the second view 410 or through the search icon 425 of the fourth view 420, a target for a search related to the input keyword may change. For example, when the search interface 431 is accessed through the search icon 415 of the second view 410, the terminal may suggest a search result by performing a search related to the input keyword in the plurality of chatrooms. When the search interface 431 is accessed through the search icon 425 of the fourth view 420, the terminal may suggest a search result by performing a search related to the input keyword in the corresponding chatroom.

Referring to FIG. 4C, a screen 460 provided as a search result per date through the second search interface 435 provided in the form of the calendar screen 437 in the fifth view 430, and a screen 470 provided as a sender search result through the first search interface 433 provided in the form similar to the screen 439 are illustrated.

When a date, for example, Jun. 20, 2018, is selected through the second search interface 435, the screen 460 may be a screen provided as a result of searching for data (photo(s) and/or video(s)) sent on the corresponding date (Jun. 20, 2018) in the corresponding chatroom or the plurality of chatrooms. For example, when 4 photos and 2 videos were found as being sent on Jun. 20, 2018 in the corresponding chatroom or the plurality of chatrooms, the number of found data may be displayed on the screen 460 together with the photos and videos corresponding to the search result. The number of the found data may be displayed above a region in which the found data are displayed on the screen 460, for example, in the form like "4 photos. 2 videos". In addition, profiles of chatrooms to which data corresponding to a search result belong may be displayed in a partial region 465 of the screen 460, for example, at the top of the screen. Further, section(s) of chatroom(s) found with respect to the corresponding date may be displayed, and thumbnail image(s) of a search result for each chatroom may be displayed.

As described above, when the second search interface 435 is accessed through the search icon 415 of the second view 410, the terminal may search for data (photo(s) and/or video(s)) sent on the corresponding date (Jun. 20, 2018) in the plurality of chatrooms. When the second search interface 435 is accessed through the search icon 425 of the fourth view 420, the terminal may search for data (phot(s) and/or video(s)) sent on the corresponding date (Jun. 20, 2018) in the corresponding chatroom.

When a sender, for example, CCC, is selected through the first search interface 433, the screen 470 may be a screen provided as a result of searching for data (photo(s) and/or video(s)) sent by the sender CCC in the corresponding chatroom or the plurality of chatrooms.

For example, when 10 photos and 1 video were found as being sent by the sender CCC in the corresponding chatroom or the plurality of chatrooms, the data (photo(s) and/or video(s)) corresponding to the search result may be displayed to be arranged in an order of sending dates (in an order of recent dates) on the screen 470. In this example, the number of found data may also be displayed together with the data corresponding to the search result. The number of the found data may be displayed on the top of the screen 470 in the form like "sent 10 photos. 1 video", together with the name of the sender CCC. In addition, profiles of chatrooms in which the sender, having sent the data (photo(s) and/or video(s)) corresponding to the search result, participates may be displayed in a partial region 475 of the screen 470, for example, a region below the name of the sender CCC. In an example, a list of chatrooms in which the sender CCC participates may be displayed in the region 475, instead of the profiles of the chatrooms in which the sender CCC participates.

Although not shown in the drawings, the instant messenger application may provide various themes for searching for content. For example, the various themes may include a season theme of spring, summer, fall and winter, an animal theme of dogs and cats, a food theme, a nature theme such as mountains, the sea and the sky, a plant theme such as flowers, a baby theme, and a birthday theme. When one of the themes is selected, contents corresponding to the selected theme, among contents stored through a storage service of the instant messenger application, may be selectively provided.

FIG. 5 illustrates a process of deleting data in an instant messenger application according to an example embodiment. Referring to FIG. 5, an operation performed when a user requests to delete an image speech bubble 513 including an image x from a chatroom 510 in which the user participates is illustrated.

For example, when the image speech bubble 513 is sent in the chatroom 510, and the user clicks the image speech bubble 513, a detail view screen of the image x may be displayed. In this example, the detail view screen of the image x may correspond to the third view 240. The image x included in the image speech bubble 513 may be integrated to correspond to the image content type as described above, and displayed in the form of the third view 240 in response to the image x included in the second view being selected.

When the user deletes the image speech bubble 513 including the image x from the chatroom 510, the deletion of the image x from the chatroom 510 may be synchronized with the integrated data.

For example, when a delete icon 517 is selected in a menu 515 displayed in relation to the image speech bubble 513 in the chatroom 510, the terminal may receive a delete request for the image speech bubble 513. As described above, when a delete request for a message including one of the integrated data, for example, the image speech bubble 513 including the image x, is received in one of a plurality of chatrooms, for example, the chatroom 510, the terminal may delete the image x being data included in the delete-requested image speech bubble 513, among the integrated data.

Similarly, when the delete icon 248 is selected in the third view 240, the terminal may receive a delete request for one of the integrated data, for example, the image x. The terminal may delete a message corresponding to the delete-requested data, for example, the image speech bubble 513 corresponding to the image x, among a plurality of messages in the chatroom 510 in which the delete-requested data, for example, the image x, was sent.

When the image x is deleted from the chatroom 510 and/or the third view 240, a thumbnail image of the image x may be deleted together.

Figure 6:
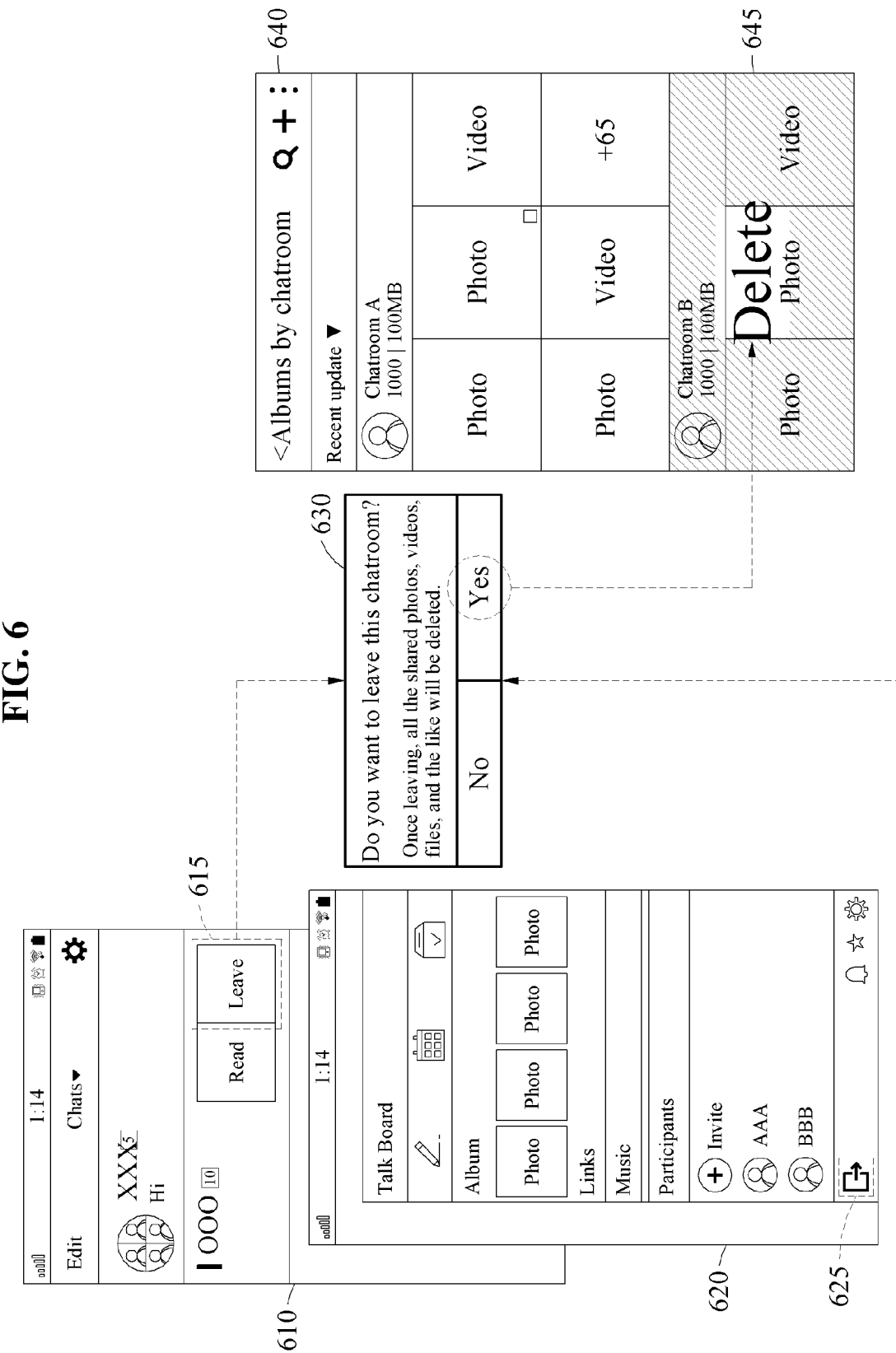
FIG. 6 illustrates an operation performed when a user leaves a chatroom in an instant messenger application according to an example embodiment.

FIG. 6 illustrates an operation performed when a user leaves a chatroom in an instant messenger application according to an example embodiment. Referring to FIG. 6, an operation performed when a user selects a leave button 615 included in a chatroom 610, or selects a leave icon 625 included in Talk Board 620 is illustrated.

For example, in response to the leave button 615 or the leave icon 625 being selected in one of a plurality of chatrooms, a terminal may receive a leave request for the chatroom. When the user attempts to leave the chatroom by selecting the leave button 615 or the leave icon 625, the terminal may display a warning message 630 informing that photos, videos, and files shared through the chatroom will be deleted if the user leaves the chatroom, before deleting the data. In this example, the warning message 630 may include a yes button for finally confirming the leave, and a no button for cancelling the leave.

When the user selects the yes button included in the warning message 630, the terminal may receive or accept the leave request. In response to reception or acceptance of the leave request, the terminal may delete data 645 sent in the leave-requested chatroom, among integrated data 640.

In an example, even when the user leaves the chatroom, the data may be maintained without being deleted, at a request of the user. For example, when the user wants to leave the chatroom, a guide including an option with respect to data storing, like "Do you want to store the data?" may be provided to the user. In response to the option being selected, the data of the chatroom may be maintained without being deleted, despite the user's leaving the chatroom.

Figure 7:
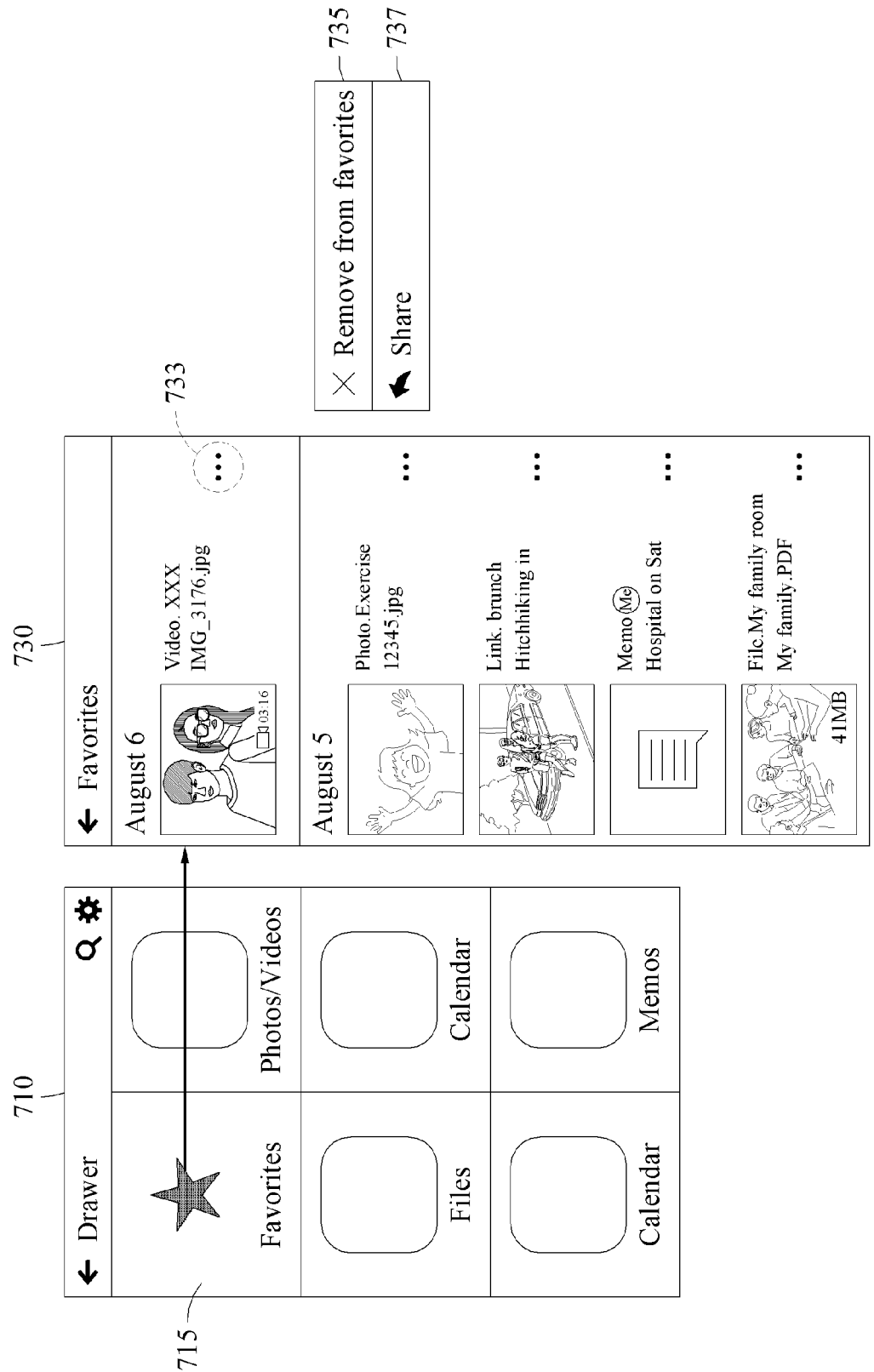
FIGS. 7 and 8 illustrate operations associated with favorite data marked by a user in an instant messenger application according to an example embodiment.

FIG. 7 illustrates an operation associated with favorite data marked by a user in an instant messenger application according to an example embodiment. Referring to FIG. 7, a sixth view 730 provided when a first view 710 and a favorite icon 715 included in the first view 710 are selected, is illustrated. The favorite icon 715 may be an icon corresponding to a favorite data type.

The favorite icon 715 included in the first view 710 may be, for example, an entry point for accessing data marked as favorites by a user. When the user selects the favorite icon 715, the terminal may provide the sixth view 730 integrating and displaying favorite data, among data sent and received in a plurality of chatrooms.

For example, the terminal may integrate the favorite data based on times at which the data were marked as favorites by the user. The terminal may display timeline feeds corresponding to the integrated favorite data in the sixth view 730. Data such as photos, videos, files, links, and memos included in each chatroom may be marked as favorites through activation of favorite icons corresponding to the data. When the user selects a view more icon 733 corresponding to a timeline feed displayed in the sixth view 730, a cancel button 735 for cancelling activation of a favorite function and a share button 737 may be displayed. The user may request to delete the corresponding timeline feed from favorite data by selecting the cancel button 735. The user may share the corresponding timeline feed by selecting the share button 737.

When the user selects one of the timeline feeds displayed in the sixth view 730, a detail view screen corresponding to the selected feed, for example, a detail view like the third view 240 of FIG. 2, may be landed.

Figure 8:
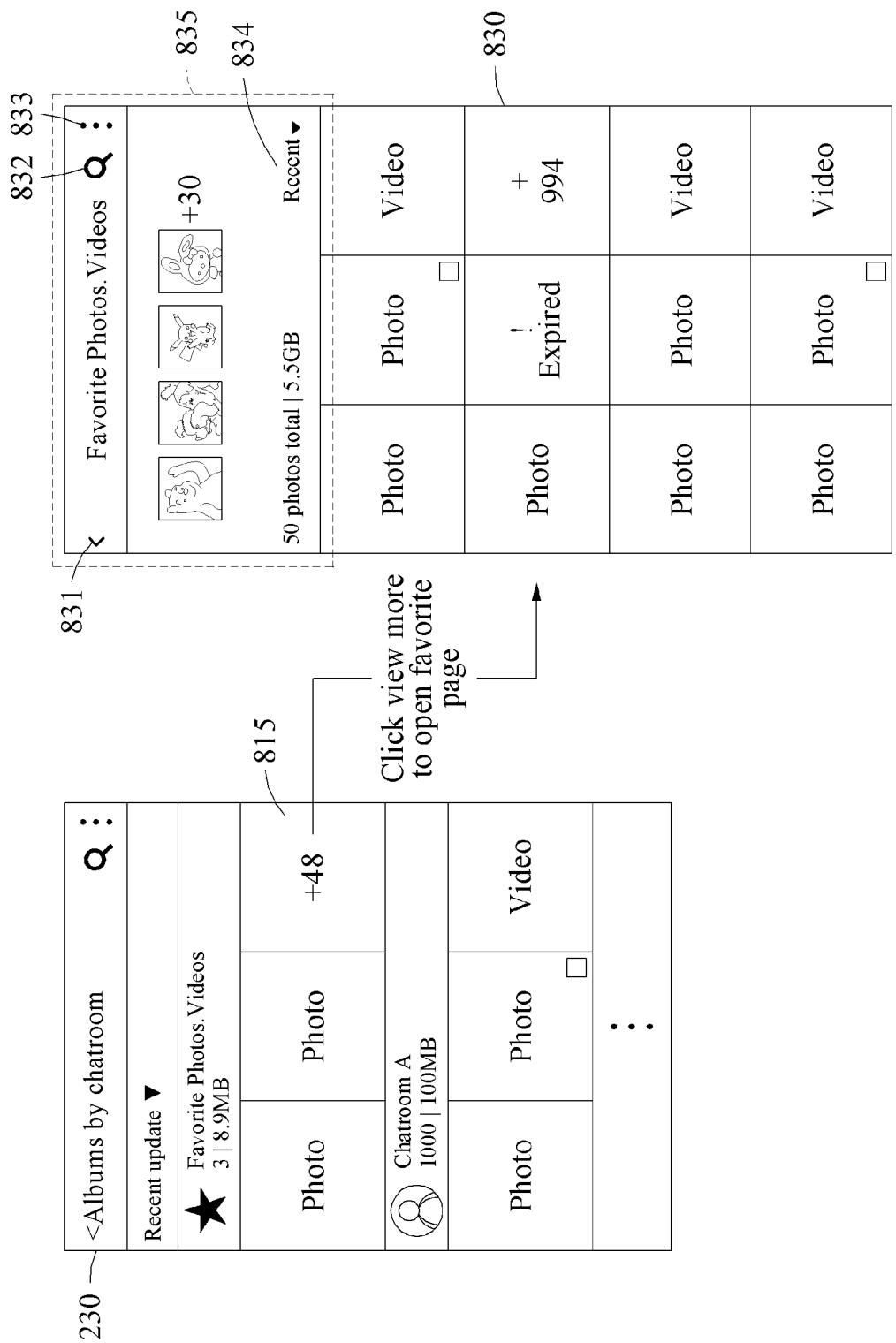

FIG. 8 illustrates an operation associated with favorite data marked by a user in an instant messenger application according to an example embodiment. Referring to FIG. 8, a favorite page 830 displayed when the second view 230 and a view more icon 815 of favorite data included in the second view 230 are selected, is illustrated.

When the number of favorite data integrated in the second view 230 is greater than a predetermined number, the view more icon 815 of the favorite data may be displayed in the second view 230. In this example, data types of the integrated favorite data may all correspond to an image content type.

When a user selects the view more icon 815, the favorite page 830 may be displayed. The favorite page 830 may include favorite data not displayed in the second view 230. The favorite page 830 may include the integrated favorite data, and profiles of chatrooms to which the favorite data belong. The profiles of the chatrooms to which the favorite data belong may be displayed, for example, in an top region 835 of the favorite page 830. In this example, up to 5 profiles of chatrooms to which the favorite data belong may be displayed. When the number of profiles of chatrooms to which the favorite data belong exceeds "5", profiles of the other chatrooms, except for the 5 profiles, may be displayed in the form of "+number", for example, "+30". Further, information related to the favorite page 830 may be displayed in the top region 835 of the favorite page 830. The information related to the favorite page 830 may include, for example, the total number of favorite photos, the total number of favorite videos, and the total size thereof.

The favorite page 830 may include a back button 831, a search icon 832, a view more icon 833 and a sort icon 834. The back button 831, the search icon 832, the view more icon 833 and the sort icon 834 may be displayed in the top region 835 of the favorite page 830. In addition, a title of the corresponding page, for example, "Favorite photos, videos", may be displayed in the top region 835 of the favorite page 830.

When the user selects the back button 831, the terminal may move to the second view 230 corresponding to a main tap of albums by chatroom. In this example as well, the second view 230 may be opened as a push view.

When the user selects the search icon 832, the album search specification described through FIGS. 4A through 4C may be provided identically. When the user selects the view more icon 833, a menu for selecting photo(s) and/or video(s) included in the favorite page 830 may be provided.

When the user selects the sort icon 834, an arrangement option with respect to the photo(s) and/or video(s) included in the favorite page 830 may be provided. The arrangement option may be set as an order of recent by default, and there may be provided various arrangement criteria such as, for example, by date, by sender, by chatroom. When a by-date arrangement criterion is selected, the photo(s) and/or video(s) included in the favorite page 830 may be arranged based on dates or points in time at which the photo(s) and/or video(s) were sent, and may be displayed by date.

The view more icon described above may be an icon for further viewing additional functions not displayed on the screen. However, the additional functions through the view more icon described above are merely an example. The additional functions may be provided directly by the corresponding screen or UI, not through the view more icon, depending on the configuration of the screen or UI.

Figure 9:
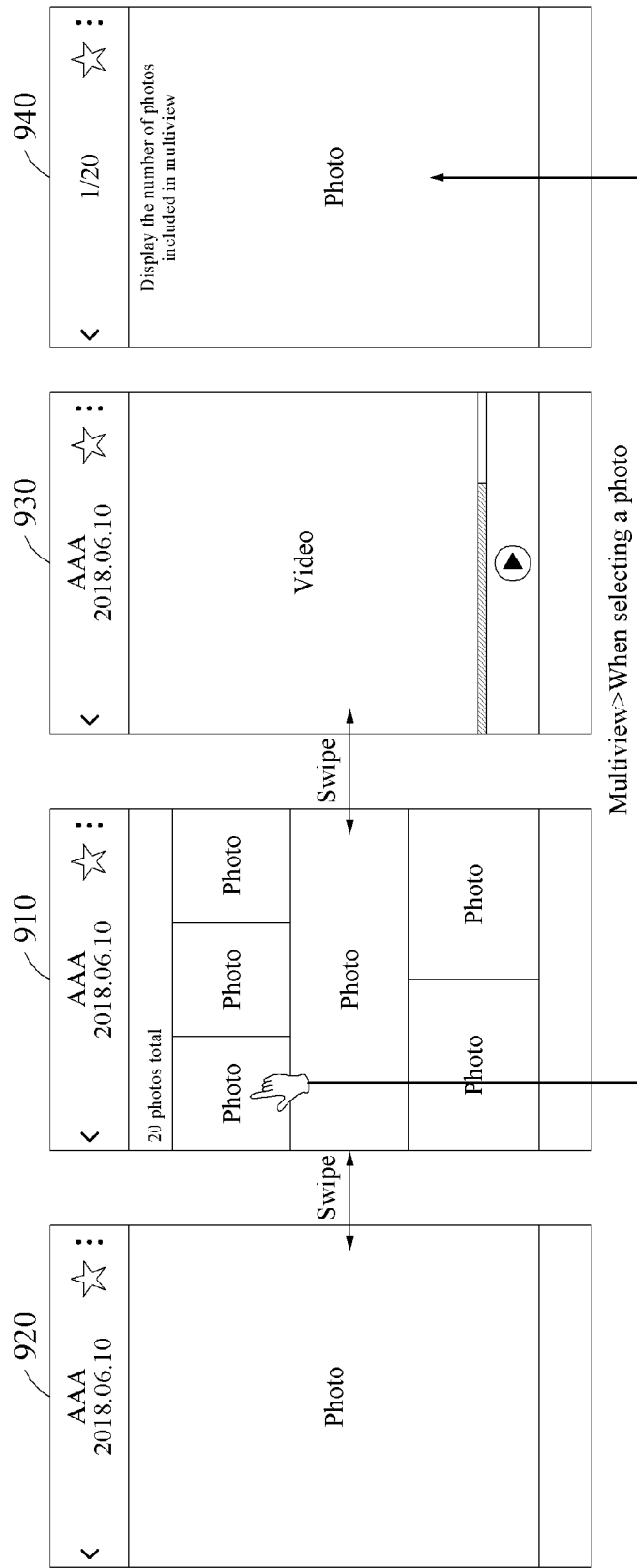
FIG. 9 illustrates an operation performed when a swipe input with respect to integrated data is received in an instant messenger application according to an example embodiment.

FIG. 9 illustrates an operation performed when a swipe input with respect to integrated data is received in an instant messenger application according to an example embodiment. Referring to FIG. 9, a fourth view 910 provided according to an example embodiment, a photo detail view 920 provided in response to a swipe input with respect to the fourth view 910, a video detail view 930, and a photo multi-detail view 940 are illustrated. The photo detail view 920, the video detail view 930, and the photo multi-detail view 940 may correspond to the examples of the third view 240 described above.

For example, when a left swipe input with respect to the fourth view 910 is received, a terminal may provide the photo detail view 920 corresponding to a photo included in the fourth view 910. In this example, the photo detail view 920 may be a detail view corresponding to a photo positioned at a start point of the left swipe input in the fourth view 910, a photo positioned first in the fourth view 910, or a most recently sent photo in the fourth view 910.

When a right swipe input with respect to the fourth view 910 is received, the terminal may provide the video detail view 930 corresponding to a video included in the fourth view 910. In this example, the video detail view 930 may be a detail view corresponding to a video positioned at a start point of the right swipe input in the fourth view 910, a video positioned first in the fourth view 910, or a most recently sent video in the fourth view 910.

For ease of description, the description has been limited to the left swipe and the right swipe. However, the left swipe and the right swipe may be implemented as swipes provided in two different directions. For example, the left swipe and the right swipe may work reversely.

When a user selection with respect to a (photo) multiview included in the fourth view 910 is received, the terminal may provide the photo multi-detail view 940 of photos included in the selected multiview. The number of the photos included in the multiview may be displayed at the top of the photo multi-detail view 940. The photo multi-detail view 940 may display a number of photos included in the multiview all at once. When an individual photo is selected in the photo multi-detail view 940, the individual photo may be displayed, and the user may move to a previous photo or a next photo among the photos grouped in the multiview, by a swipe with respect to the displayed individual photo.

Although not shown in the drawings, the instant messenger application may provide a tag and/or a layer to add a description to the user when updating contents to the cloud server. For example, when the user selects a plurality of photos in my chatroom or a general chatroom and requests to upload the selected photos, a description related to a photo bundle and a layer for inputting a C# tag may be provided to the user. In this example, when a # search provided in the instant messenger application is performed, # tags input in the photo bundle may be searched together.

The # search may be a function to provide a search result based on a keyword to a user and share the search result in the chatroom when the keyword starting with # is input in a chatroom of an instant messaging service. According to the example described above, the search result may include a search result through a search portal, and contents with a # tag associated with the corresponding keyword, among contents stored in a cloud server of the user.

Although not shown in the drawings, the instant messenger application may provide an interface for selecting contents stored in the cloud server through Talk Drawer or contents stored in a local album of a terminal, when sending a photo or video to a chatroom. For example, the instant messenger application may provide an interface, for example, "View All Albums", when sending a photo/video in the chatroom. A view corresponding to "View All Albums" may include a first tap for accessing the local album and a second tap for accessing the cloud server.

Although not shown in the drawings, the terminal may include an input interface, a processor, and a display. The terminal may further include a memory. The input interface, the processor, the display, and the memory may be connected to each other through a communication bus. The terminal may be, for example, a smart phone, a wearable device, or a user device configured to perform the same or similar function.

The input interface may receive data sent and received through a chatroom.

The processor may provide a first view including types of data that may be sent and received through the chatroom. The processor may receive a selection with respect to one of the types, through the input interface. The processor may provide a second view integrating and displaying data corresponding to the type selected by a user, among data sent and received in a plurality of chatrooms in which the user participates.

The memory may store the data, integrated by the processor, corresponding to the type selected by the user.

In addition, the processor may perform the at least one method or an algorithm corresponding to the at least one method described with reference to FIGS. 1 through 11. The processor may execute a program and control the terminal. Program codes to be executed by the processor may be stored in the memory.

The units described herein may be implemented using a hardware component, a software component and/or a combination thereof.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of an instant messenger application, the operating method comprising:
   providing a first view including types of data sent and received through a chatroom;
   receiving a selection of one of the types;
   providing a second view integrating and displaying data corresponding to the selected type, among data sent and received in a plurality of chatrooms in which a user participates;

receiving a selection of one of the data included in the second view; and providing a third view for detail view of the selected data, by accessing the selected data based on an access path corresponding to an account level of the user, wherein the second view displays each of the data corresponding to the selected type in a region predetermined based on a chat room, from which the each of the data is retrieved, of the plurality of chatrooms, the types of data include a photo type or a video type, and based on determining that the photo type or the video type is selected, the second view displays each of at least one photo or video corresponding to the selected type in a region predetermined based on the chat room, from which the each of the at least one photo or video is retrieved, of the plurality of chatrooms.

2. The operating method of claim 1, wherein the providing of the third view comprises:

determining whether the selected data is stored in a local storage of a terminal on which the instant messenger application is installed;

displaying the selected data by loading the selected data from the local storage, in response to determination that the selected data is stored in the local storage; and displaying the selected data by downloading the selected data from a mailbox of a messaging server, in response to determination that the selected data is not stored in the local storage.

3. The operating method of claim 1, wherein the providing of the third view comprises displaying the selected data by downloading the selected data from a storage of a cloud server.

4. The operating method of claim 1, further comprising:

when a search request for searching for the data corresponding to the selected type is received through the second view, providing a fifth view including at least one of a first search interface for searching for a sender of the data corresponding to the selected type and a second search interface for searching for a sending date of the data corresponding to the selected type.

5. An operating method of an instant messenger application, the operating method comprising:

providing a first view including types of data sent and received through a chatroom;

receiving a selection of one of the types;

providing a second view integrating and displaying data corresponding to the selected type, among data sent and received in a plurality of chatrooms in which a user participates;

receiving a selection of one of the data included in the second view;

providing a third view for detail view of the selected data, by accessing the selected data based on an access path corresponding to an account level of the user; and when a search request for searching for the data corresponding to the selected type is received through the second view, providing a fifth view including at least one of a first search interface for searching for a sender of the data corresponding to the selected type and a second search interface for searching for a sending date of the data corresponding to the selected type, wherein the first search interface includes a predetermined number of sender candidates selected from participants in the plurality of chatrooms based on a data sending count, and the second search interface includes a predetermined number of sending date candidates selected from dates the data corresponding to the selected type were sent in the plurality of chatrooms, based on the data sending count.

6. The operating method of claim 4, further comprising:

displaying data corresponding to search results through the fifth view; and displaying profiles of chatrooms to which the data corresponding to the search results belong.

7. The operating method of claim 1, further comprising:

receiving a delete request for one of the integrated data; and deleting a message corresponding to the delete-requested data, among a plurality of messages in a chatroom through which the delete-requested data was sent.

8. The operating method of claim 1, further comprising:

receiving a leave request for one of the plurality of chatrooms; and deleting data sent in the leave-requested chatroom, among the integrated data.

9. The operating method of claim 8, further comprising:

providing a guide including an option inquiring of whether to maintain the data sent in the leave-requested chatroom without deleting the data, in response to reception of the leave request, wherein the deleting is performed based on whether the option is selected.

10. An operating method of an instant messenger application, the operating method comprising:

providing a first view including types of data sent and received through a chatroom;

receiving a selection of one of the types;

providing a second view integrating and displaying data corresponding to the selected type, among data sent and received in a plurality of chatrooms in which a user participates;

receiving a selection of one of the data included in the second view; and providing a third view for detail view of the selected data, by accessing the selected data based on an access path corresponding to an account level of the user; and receiving a selection of an entry point for accessing favorite data marked by the user, among the data, in the first view; and providing a sixth view integrating and displaying the favorite data, among the data sent and received in the plurality of chatrooms, in response to the selection of the entry point, wherein the providing of the sixth view comprises:

integrating the favorite data based on a time the favorite data was marked by the user; and displaying timeline feeds corresponding to the integrated favorite data.

11. The operating method of claim 10, wherein the providing of the sixth view comprises displaying profiles of chatrooms to which the favorite data belong, together with the integrated favorite data.

12. A non-transitory computer-readable storage medium storing instructions that, when executed by a processor, cause the processor to perform the operating method of claim 1.

* * * * *